United States Patent [19]

Rumbold et al.

[11] Patent Number: 5,141,185
[45] Date of Patent: Aug. 25, 1992

[54] WIRING CLIP

[75] Inventors: James W. Rumbold, Castle Rock, Colo.; Kurt G. Houk, Stow, Ohio; Raymond S. Llaughlin, Cuyahoga Falls, Ohio; Kenneth A. Golonka, Richmond Heights, Ohio

[73] Assignee: Erico International Corporation, Cleveland, Ohio

[21] Appl. No.: 669,362

[22] Filed: Mar. 14, 1991

Related U.S. Application Data

[63] Continuation-in-part of Ser. No. 555,174, Jul. 20, 1990, abandoned.

[51] Int. Cl.$^5$ .............................................. F16B 15/00
[52] U.S. Cl. ................................ 248/71; 248/68.1; 248/74.1
[58] Field of Search .................... 248/205.1, 71, 74.2, 248/74.3, 74.4, 74.5, 68.1, 316.7, 316.1, 916, 57; 174/48; 24/543, 601.8, 518; 52/357

[56]     References Cited
         U.S. PATENT DOCUMENTS

| | | | |
|---|---|---|---|
| 2,972,461 | 2/1961 | Balbach | 248/74.1 X |
| 3,037,729 | 6/1962 | Holton | 248/71 |
| 3,334,461 | 8/1967 | York | 248/57 X |
| 3,418,421 | 12/1968 | Goebel | 174/48 X |
| 3,528,636 | 9/1970 | Schmidt | 248/57 |
| 3,854,001 | 12/1974 | Dola | 174/48 |
| 4,050,205 | 9/1977 | Ligda | 52/357 |
| 4,560,126 | 12/1985 | Judkins | 248/72 |
| 4,967,990 | 11/1990 | Rinderer | 248/205.1 |

Primary Examiner—J. Franklin Foss
Attorney, Agent, or Firm—Renner, Otto, Boisselle & Sklar

[57] ABSTRACT

A wiring clip for stud frame dry wall construction holds various forms of wiring a required distance from the nearest edge or face of the stud to which the dry wall is secured. A wire form of the clip is particularly suitable for wood studs while strap forms may be used with studs made of metal or wood or other material. Each form of the invention includes an L-shape portion adapted to be secured to the face and/or side of the stud. Extending from such L-shape portion parallel to and recessed from the edge of the stud (interior of the wall board) is a strut and arm with the arm being hinged at the end of the strut remote from the L-shape portion and adapted to be folded back to extend parallel to the strut and locked in place to embrace wiring between such arm and strut. Each form of the clip is easy to install and accommodates a variety of types of wiring. The clips may be crimped by pliers tightly to embrace and conform to the wiring after installation. When properly installed, the wiring will meet code requirements.

25 Claims, 5 Drawing Sheets

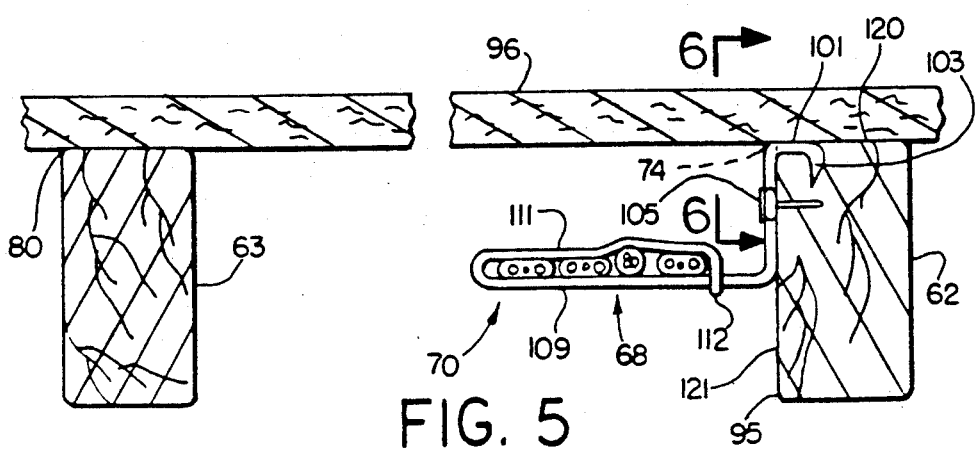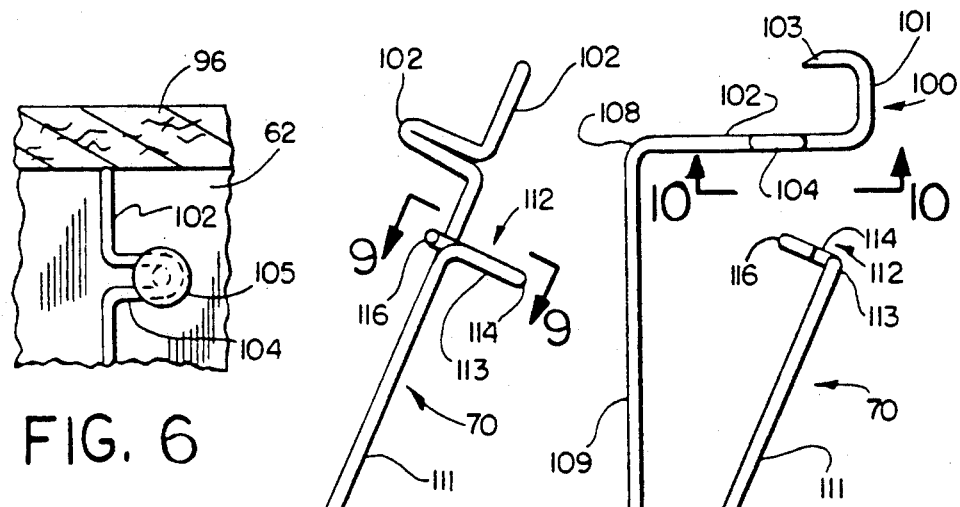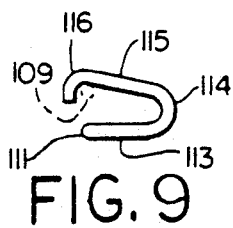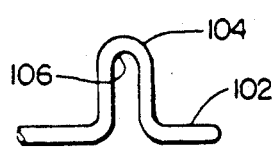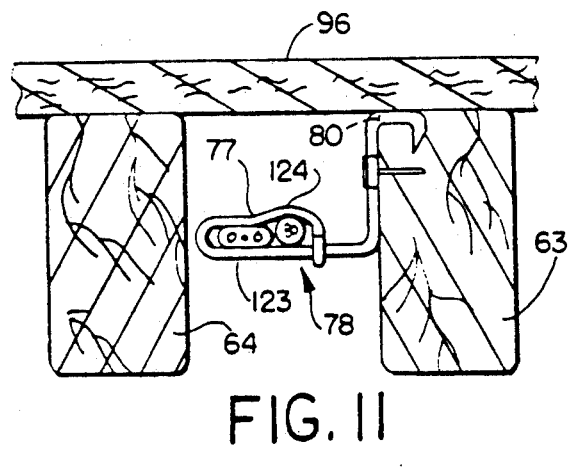

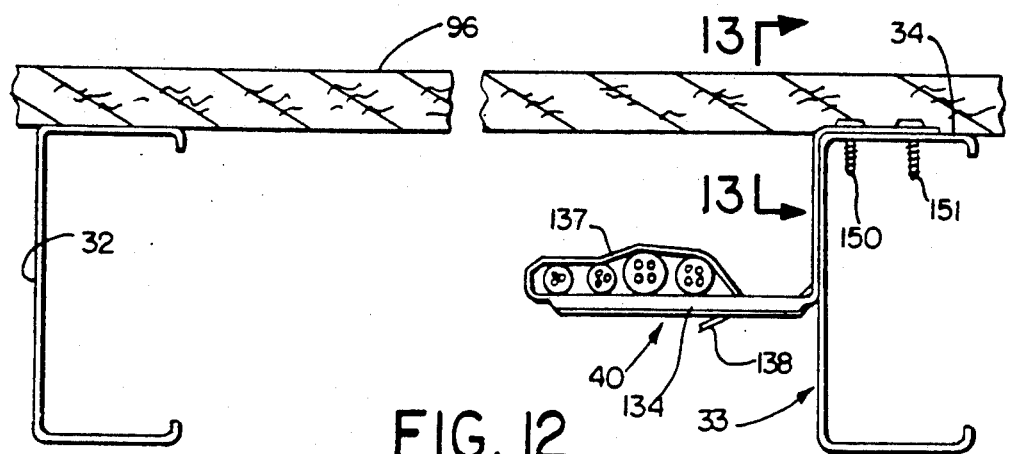
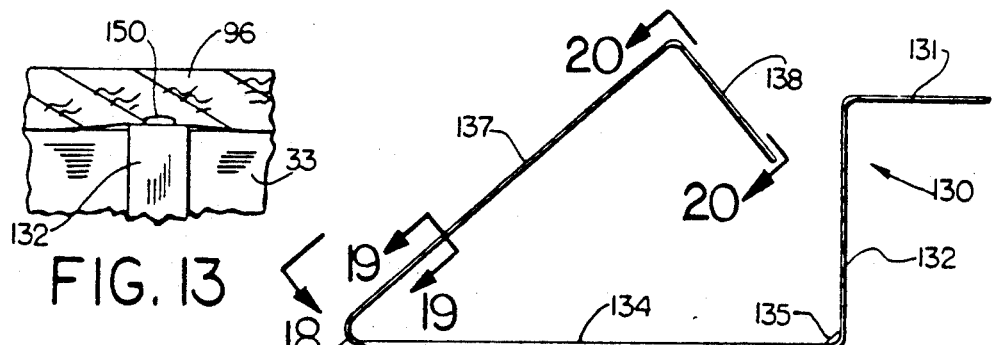
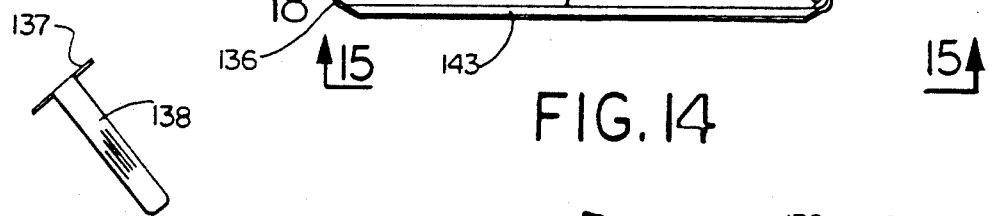
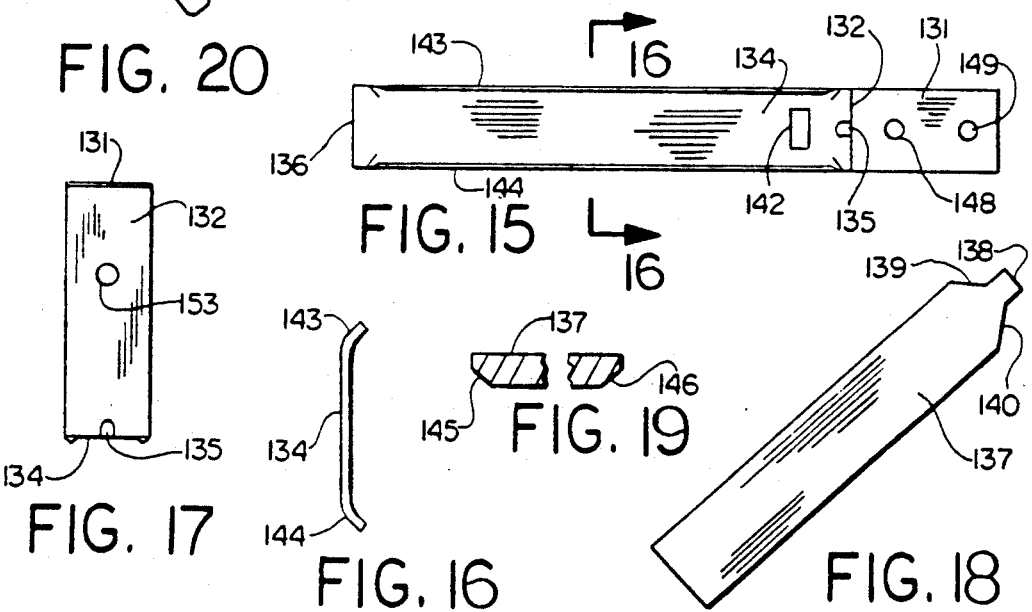
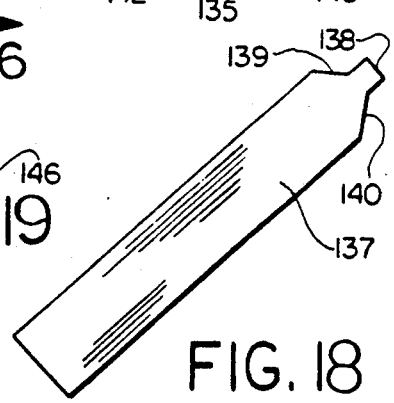

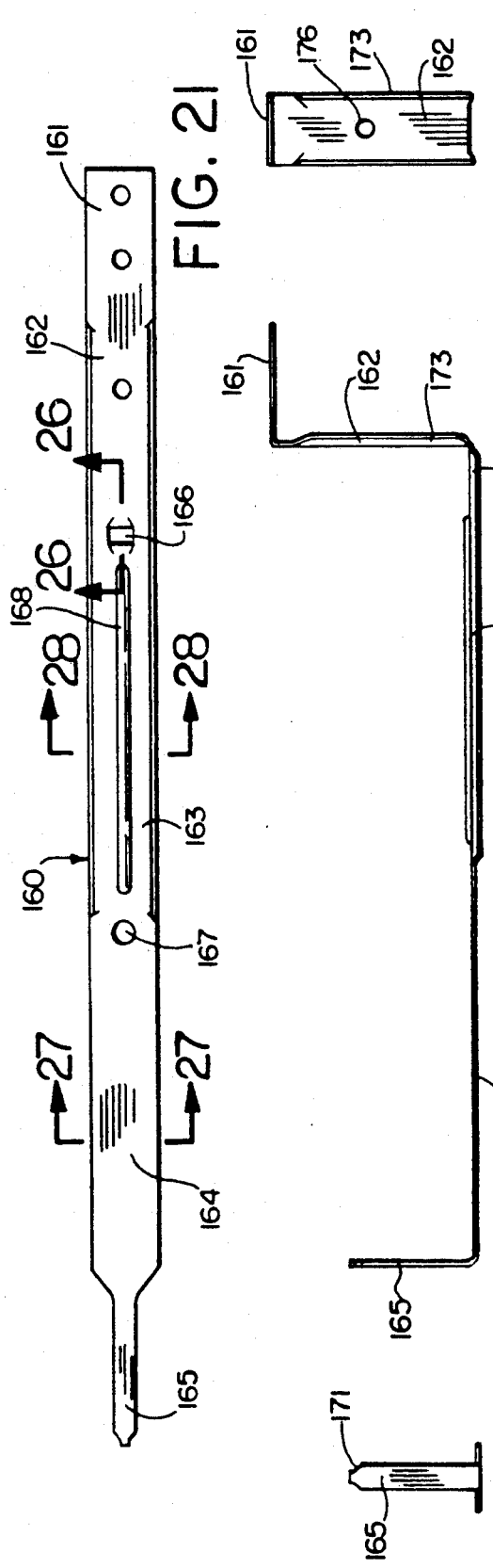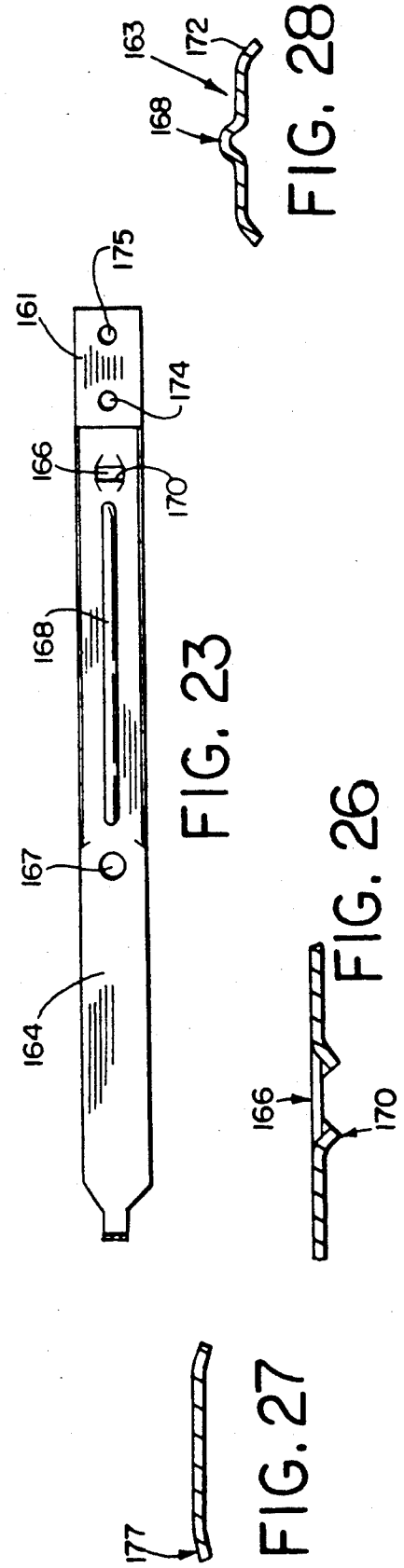

WIRING CLIP

RELATED APPLICATION

This application is a continuation-in-part of the application of James W. Rumbold et al, Ser. No. 07/555,174, filed Jul. 20, 1990, entitled "Wiring Clip" now abandoned.

This invention relates generally as indicated to a wiring clip and more particularly a clip which will enable wiring to meet code requirement of spacing from the nearest edge of the framing member or stud.

BACKGROUND OF THE INVENTION

In dry wall construction, gypsum board panels are secured to the face of studs or framing members which may be wood or metal or other material. Before the wall boards are secured in place, internal wiring to various outlets, switch plates and the like is installed. Much of the wiring may run parallel to the frame members.

The wall boards are then secured to the stud frame, usually by fasteners installed with power driven tools. Since the internal stud is concealed when the wall board is in place, it is easy for the fastener to miss the stud. The fastener is then driven into the open interior of the wall. The fastener, especially when driven by a power tool, may pierce anything in its path such as wiring. If the fastener engages the wiring it may damage the insulation or covering and may well cause a short. The damage may go unnoticed. If noticed, expensive repairs are required which may require opening the wall.

Because of this problem the National Electric Code now specifies that wiring be positioned a defined safe distance (1¼ inches) from the nearest edge of the framing member. If such spacing cannot be maintained the wiring has to be protected by a 1/16 inch steel plate or sleeve. The code requirement is found in Article 300, Section 300-4(d) N.E.C.

A typical 2×4 stud used in dry wall construction has dimensions somewhat less than the name would imply. A typical 2×4 is perhaps 3½ inches from edge to edge. If the wiring is to be positioned 1¼ inches from the nearest edge, this leaves only a 1 inch envelope in the center of the stud or wall within which to support the wiring. This then requires the wiring to be firmly supported and disciplined to avoid encroachment into the restricted space.

A present practice is to staple wiring such as ROMEX to the major flat side of a wood stud. This becomes a problem, particularly if more than one wiring run is required since wiring, if stapled at all, should not be stapled on top of each other, particularly with a power operated tool.

Accordingly, a clip which may be mounted on the stud to support and discipline the wiring to avoid encroachment into the restricted space and comply with the code is desirable.

Since a number of clips may be required for the necessary discipline of the wiring it is also important that such clips be low cost and easy to install.

The following U.S. patents were noted in a preliminary patentability search:

| | |
|---|---|
| 188,317 | 3,606,217 |
| 237,976 | 3,785,598 |
| 424,016 | 4,623,102 |

-continued

| | |
|---|---|
| 736,867 | 4,790,060 |
| 3,036,801 | 4,799,641 |
| 3,216,025 | 4,881,705 |
| 3,233,851 | 4,913,386 |

While some relate to stud brackets for securing piping, such as U.S. Pat. No. 3,216,025 to roll, none seem related to the problem nor solution of the present invention.

SUMMARY OF THE INVENTION

A wiring clip for stud frame dry wall construction holds various forms of wiring a required distance from the nearest edge or face of the stud to which the dry wall is secured. A wire form of the clip is particularly suitable for wood studs while strap forms may be used with studs made of metal or wood or other material. Each form of the invention includes an L-shape portion adapted to be secured to the face and/or side of the stud. Extending from such L-shape portion parallel to and recessed from the edge of the stud (interior of the wall board) is a strut and arm with the arm being hinged at the end of the strut remote from the L-shape portion and adapted to be folded back to extend parallel to the strut and locked in place to embrace wiring between such arm and strut. The end of the arm of the wire form clip has a hook to engage the strut and hold it closed. The end of the arm of strap forms of the clip has a bendable right angle tab which is inserted through a slot in the strut and bent to secure the strut and arm generally parallel to each other and embracing the wiring. The L-shape portion of the wire form clip includes a pointed integral nail form end to be driven into the face of the stud and a U-shape offset to receive a fastener driven into the side of the stud. The L-shape portion of the strap forms of the clip is provided with holes for sheet metal screws in the case of metal studs, or screws or nails in the case of wood studs. Each form of the clip is easy to install and accommodates a variety of types of wiring. The clips may be crimped by pliers tightly to embrace and conform to the wiring after installation. When properly installed, the wiring will meet code requirements.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 5 is a horizontal section of a dry wall showing the wire form clip of the present invention in use;

FIG. 6 is a fragmentary section taken from the line 6—6 of FIG. 5;

FIG. 7 is a side elevation of the clip prior to closing;

FIG. 8 is an edge elevation taken from the lower right of FIG. 7 or parallel to the open arm;

FIG. 9 is an elevation of the hooked end of the open arm and showing in phantom the other arm when the clip is closed about the wiring;

FIG. 10 is a view of the fastener receiving bight taken from the line 10—10 of FIG. 7;

FIG. 11 is a view similar to FIG. 5 but showing another smaller form of wire clip for use with more closely spaced studs;

FIG. 12 is a view similar to FIG. 5 but showing a strap form of clip used with metal studs;

FIG. 13 is a view taken from line 13—13 of FIG. 12;

FIG. 14 is a side elevation of a strap form clip;

FIG. 15 is a bottom plan of such clip as seen from line 15—15 of FIG. 14;

FIG. 16 is an enlarged section of the strut as seen from line 16—16 of FIG. 15;

FIG. 17 is an end elevation of a strap form clip seen from the right hand side of FIG. 14;

FIG. 18 is a plan view of the open arm seen from line 18—18 of FIG. 14;

FIG. 19 is a further enlarged transverse section of the open arm showing the coined interior corners;

FIG. 20 is a plan view of the inserting tab on the end of the open arm;

FIG. 21 is a top plan view of another strap form of the clip in a flattened, unbent configuration;

FIG. 22 is a side view of such another form of the clip as it appears as shipped and prior to installation with the L-shape portion adapted to be secured to a stud;

FIG. 23 is a top plan view of the clip shown in FIG. 22;

FIG. 24 is an end elevation as seen from the right hand side of FIG. 22:

FIG. 25 is a similar view from the left hand side of FIG. 22;

FIG. 26 is an enlarged transverse section of the tab receiving slot seen from the line 26—26 of FIG. 21;

FIG. 27 is an enlarged section of the arm showing the angled lateral edges as seen from the line 27—27 of FIG. 21; and FIG. 28 is an enlarged section of the strut showing the centerline ridge as seen from the line 28—28 of FIG. 21.

DETAILED DESCRIPTION OF THE PREFERRED EMBODIMENTS

Figure 1:
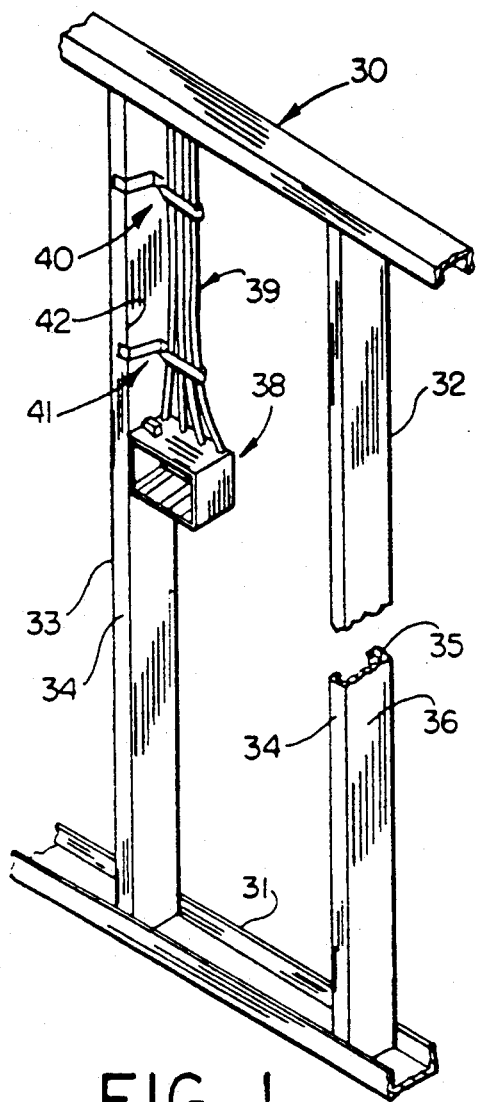
FIG. 1 is a fragmentary perspective view of a dry wall metal stud frame using a strap form clip of the present invention.

Referring initially to FIG. 1 there is illustrated a metal stud framing system for a dry wall without the wall board. The framing system comprises a horizontal top metal channel 30 and a horizontal bottom metal channel 31 with vertically extending channel shape metal studs 32 and 33 therebetween. The center spacing of the studs may vary. Each stud includes opposed relatively narrow faces 34 and 35 to which the wall board is secured, such faces being interconnected by the side 36, the opposite side being open.

FIG. 1 illustrates an electrical box 38 mounted on the framing system with runs of wiring shown generally at 39 extending vertically from the box parallel to the framing member 33 and secured thereto by a strap form of the clip indicated at 40 and 41 in accordance with the present invention. The clips secure the wiring runs side-by-side and recessed the required 1¼ inches from the nearest edge 42 of the framing system, said edge being the edge of the face 34 to which the dry wall is secured.

Figure 2:
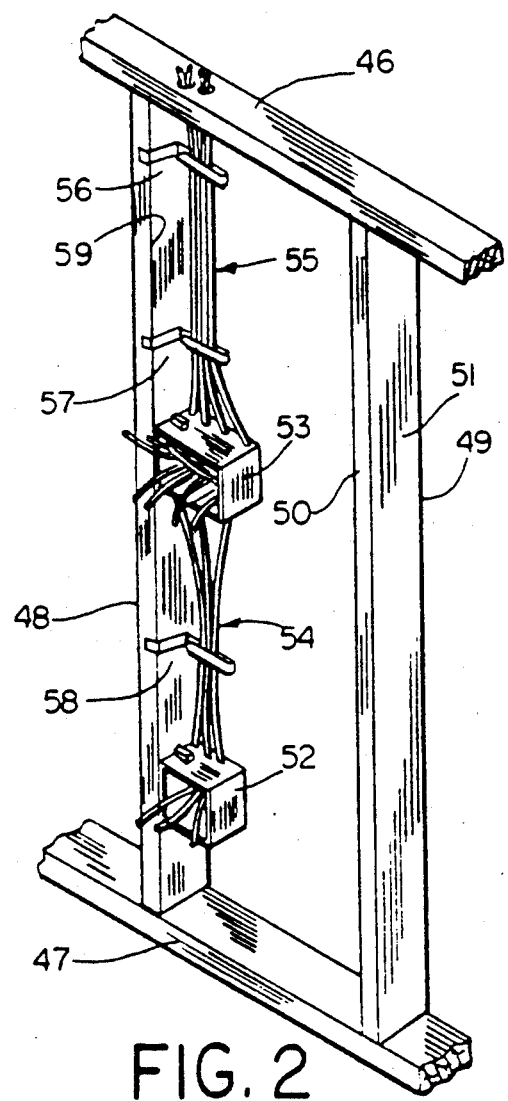
FIG. 2 is a similar view of the same clip used to wire two boxes in a dry wall wood stud frame.

In FIG. 2 there is illustrated wood framing for a dry wall construction which framing includes a top horizontal frame member 46, a bottom frame member 47 and vertically extending studs 48 and 49 therebetween. Each stud includes opposed relatively narrow faces as seen at 50 and sides 51 with the dry wall being secured to the relatively narrow faces to complete the wall framing.

FIG. 2 illustrates electrical boxes secured to the stud 48 as seen at 52 and 53 with a wiring run 54 extending from the box 52 to the box 53 parallel to the framing 48. A further wiring run 55 extends from the box 53 as indicated at 55 again parallel to the framing member 48. As illustrated three strap form electrical clips in accordance with the present invention secure such wiring as indicated at 56, 57 and 58, such clips holding the wiring in a disciplined fashion side-by-side and recessed ¼ inch from the nearest edge 59 of the framing member 48. The strap form clips 40, 41, 56, 57 and 58 are all identical and are shown in greater detail in FIGS. 12-28. As illustrated such strap form clips may be applied to either metal or wood framing.

Figure 3:
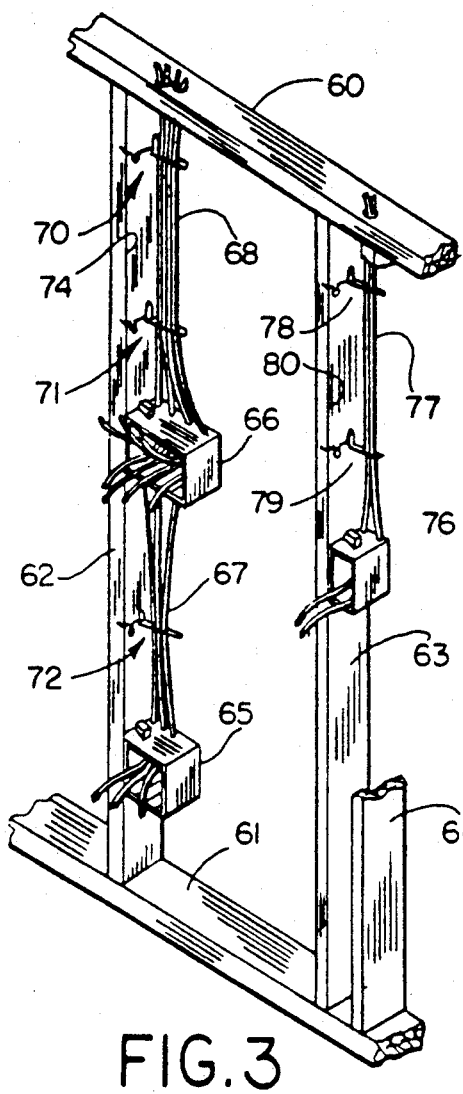
FIG. 3 is a fragmentary perspective view of a dry wall wood stud frame using a wire form clip of the present invention.
Figure 4:
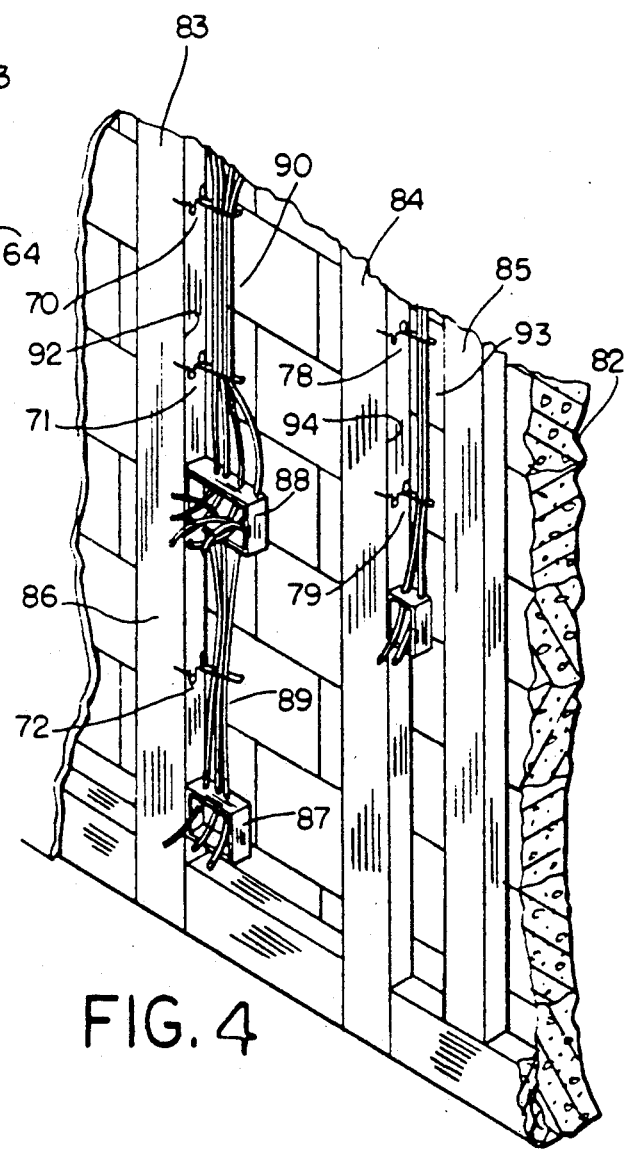
FIG. 4 is a similar view showing the wire form clip used with shallow depth studs such as those used as furring on a block wall.

Referring now to FIGS. 3 and 4 there are illustrated various applications of the wire form embodiment of the present invention. In FIG. 3 there is illustrated wood framing similar to that shown in FIG. 2. Such framing comprises a top frame member 60 and a bottom frame member 61 with wood studs 62 and 63 extending vertically therebetween. Also partially shown is a further stud 64 which is spaced more closely than the normal center spacing of the studs in a wall run. The more narrow spacing of studs is often required at door jambs, frames, or wall intersections. Secured to the left hand stud 62 are two electrical boxes 65 and 66 with a wiring run shown at 67 extending between the two boxes and at 68 from the box 66 through the top frame member. Wire form clips in accordance with the present invention shown at 70, 71 and 72 are employed to discipline such wiring and maintain it recessed 1¼ inches from the stud edge 74 which is the edge of the face to which the wall board will be secured.

Secured to the stud 63 is a box 76 with a wiring run 77 extending from the box through the top frame member parallel to the stud 63. Wire form clips shown at 78 and 79 which are similar to but somewhat smaller than the wire form clips 70, 71 and 72 are employed to hold the wire run 77 the required spacing from the edge 80 of the stud 63. In this manner the clip readily fits between the more closely spaced studs 63 and 64.

In FIG. 4 there is illustrated conventional 2×4 wood studs used as furring strips against a concrete or block wall 82. In this manner the studs indicated at 83, 84 and 85 are simply turned 90° so that the wall board is secured to the wider face 86 of the studs, such face normally being the sides as seen in FIGS. 1-3. In FIG. 4 the studs 84 and 85 are spaced more closely together as are the studs 63 and 64 in FIG. 3. The stud 86 has secured thereto boxes 87 and 88. Wire run 89 extends from box 87 to box 88 and wire run 90 extends from box 88 upwardly through the top frame member or to the ceiling. The clips 70, 71 and 72 are secured to the stud and maintain the wire runs in a disciplined fashion side-by-side and more importantly spaced from the nearest edge 92 of the stud the required recessed distance. Again a smaller box as illustrated is secured to the stud 84 and somewhat smaller clips 78 and 79 hold the wire run 93 in a disciplined manner and also spaced from the edge 94 the required distance.

Referring now to FIGS. 5-11 and initially to FIG. 5 it will be seen that the electrical clip 70 spaces the wire run 68 not only the required recessed distance from the nearest edge 74 but also from the opposite edge 95. A typical 2×4 stud as shown in FIG. 5 will be approximately 3½ inches from edge 74 to edge 95. Thus in order to recess the wiring run from such nearest edges the wiring run has to be held in a disciplined fashion within the center 1 inch envelope of a stud which is 3½ inches from edge to edge.

In FIG. 5 there is illustrated the wall board 96 secured to the studs 63 and 62 and the clip 70 secured to the stud 62 and holding the wire run 68 within that center 1 inch envelope.

Referring now additionally to FIGS. 6-10 it will be seen that the wire form of clip 70 includes an L-shape portion indicated generally at 100 which includes relatively short leg 101 and a somewhat longer leg 102 with such legs being at right angles to each other. The leg 101 terminates in a nail form sharpened point 103 which extends parallel to the leg 102. The leg 102 is provided with a U-shape offset or bight seen at 104 which enables a nail or other headed fastener 105 to be driven through the bight portion 106 of the offset.

The leg 102 extends for somewhat more than the code required 1¼ inches. The leg is bent in the opposite direction as the leg 101 as indicated at 108 and forms an elongated strut 109 which extends perpendicular to the leg 102 and parallel to the leg 101. The outer or distal end of the leg is provided with a hinge fold 110 and an arm 111 extends backwardly at an acute angle and terminates in a hook shown generally at 112. The hook as seen in FIG. 9 includes a first leg 113 extending normal to the arm 111 at the end thereof with such leg being bent in the generally U-shape form indicated at 114 and extending back almost parallel to the leg 113 but at a shallow acute angle forming leg 115 which then terminates in a bent circular hook form 116 having a sharp radius of curvature which extends for somewhat more than 90°.

In FIG. 7 the clip is shown as formed and open. By pressing on the arm 111 in a direction toward the strut 109, the arm can readily be hooked to the strut as indicated in FIG. 9, such strut being shown in phantom lines at 109. In such hooked condition the strut and arm then extend parallel to each other and fairly closely spaced.

Referring again to FIG. 5 it will be seen that the short arm 101 of the L-shape portion is designed to extend parallel to the face 120 of the stud 62 to which the wall board 96 is secured. The longer leg 102 is designed to abut against and be parallel to the side 121 of the stud 62 while the strut 109 extends normal to the side or parallel but recessed from the face 120 and thus spaced a proper distance from both edges 95 and 74.

The clip is installed by driving the nail form 103 into the face of the stud 120 and in so doing the short arm 101 will become indented in the face of the wooden stud as shown in FIG. 5. This provides a smooth surface to facilitate the securing of the wall board to the stud. After the nail form is driven into the face of the stud, a fastener such as the nail headed fastener 105 may be inserted through the U-shape bight portion and in this manner the clip is firmly secured both to the face and side of the stud. At this point the various wire forms of the run 68 may be positioned against the strut 109 and the arm closed simply by hooking the hook portion 116 around the strut shank. The installer may then crimp the wire form clip as indicated in FIG. 5 to ensure that the various wire runs shown are closely embraced and captured by the clip.

The clip 78 seen in FIG. 11 is identical to the clip 68 described in FIGS. 5-10 except that the strut 123 and the arm 124 are approximately half the length of the strut 109 and arm 111. The clip is installed in the same way and positions the wiring runs within the 1 inch envelope at the center of a conventional 2×4 stud.

Referring now to FIGS. 12-20 there is illustrated the strap form clip 40 of the present invention secured to metal stud 33 holding the wiring run 39 in the 1 inch envelop from the opposite edges of the metal studs. The dry wall 96 is secured to the metal studs after the clip is in place and the wiring running parallel to the framing member properly located.

The strap form clip includes an L-shape portion shown generally at 130 which includes a shorter leg 131 and a right angle longer leg 132, such leg being somewhat longer than the required 1¼ inch recessing of the wiring. The leg 132 is then bent to form a strut 134 extending normal to the leg 132 and parallel to the leg 131. The corner providing the bend between the leg 132 and the strut 134 includes a gusset forming indentation 135 to strengthen the clip at the bend. The strut continues to an acute angle bend 136 which connects the strut to arm 137. The arm extends backwardly at the angle indicated in front of the strut 134 and terminates in a right angle tab 138 which as illustrated in FIG. 20 is more narrow than the arm. As seen from FIG. 18 the arm actually narrows as indicated at 139 and 140 before the right angle bend of the tab 138.

The tab 138 is designed to fit through a rectangular slot 142 in the strut which is near the proximal end of the strut.

The lateral edges of the strut are bent away from the arm as indicated at 143 and 144 and the interior corners of the arm 137 are coined as indicated in the enlarged view of FIG. 19 at 145 and 146. This avoids any sharp edges which bite into the insulation of the wiring when the clip is installed and closed. The bending of the edges of the strut also rigidifies the strut.

In order to secure the clip in place the short leg 131 is provided with two holes seen at 148 and 149 which accommodate the sheet metal screws 150 and 151, respectively seen in FIG. 12. The leg 132 may also be provided with a hole seen at 153 in FIG. 17 so that an additional fastener may be provided extending through the side of the stud. However, such fastener is normally unnecessary and the fastener may be mounted on the stud so that the clip strut projects either from the closed side of the stud or the open side.

In installation the clip is secured to the face 34 of the stud 33 and the wiring runs are positioned against the interior of the strut 134. The arm 137 is then bent to insert the tab 138 through the slot 142 and such tab is then bent at right angles to hook or lock the arm in the closed position. A pair of pliers may then be employed to crimp the arm against the wiring closely to embrace the wiring and capture it between the strut and arm. It can be seen that the strap form clip may be stamped and formed from a single piece of pregalvanized 1010 sheet metal but that such sheet metal is not spring steel. The clip is easy to install and the wiring may be positioned against the rigidified strut and the arm quickly closed thereabout and crimped in place.

Referring now to FIGS. 21-28 there is illustrated another strap form of the clip wherein the arm portion 164 extends straight from and remains in the same plane as the strut portion 163 of the clip during shipment and prior to installation. FIG. 21 shows generally the clip 160 in an unbent configuration with the sections 161 and 162 of the L-shape portion in the same plane with the strut portion 163, arm portion 164 and tab 165. Further shown in FIG. 21 is slot 166 through which tab 165 extends and engages upon installation, and hole 167 which is placed at the interface of strut 163 and arm 164 to create a bend point for the desired hinging action. In this manner the arm 164 can easily be bent back upon the strut 163 and the tab 165 on the end of the arm inserted through slot 166.

FIG. 22 illustrates such strap form of the clip as it appears in its manufactured and shipping configuration with the arm portion 164 extending straight from and in the same plane as strut portion 163. The L-shape portion 161 and 162 is preformed for installation about the corner of a framing stud by the position of section 162 perpendicular to strut 163 and arm 164, and the position of section 161 perpendicular to section 162, and parallel to but offset from the strut the required distance. FIG. 22 also shows the position of tab 165 perpendicular to arm 164 to facilitate engagement of tab 165 through slot 166 as the arm hinges at hole 167. The straight form of the clip may be easily stacked for packaging and shipping and avoids entanglement of one clip with another.

The slot 166 is provided fore and aft with punched angle edges 170 as shown in FIG. 26. This assists the insertion of the tapered end 171 of tab 165 seen in FIG. 25 through slot 166. After the tab is inserted through the slot it is bent back toward the strut/arm hinge around the sharp edge 170 as in FIG. 12 thus locking the captured wiring between the strut and arm. The locking action of tab 165 through slot 166 assists in the installation of the clip whereby arm 164, upon closure about the wires upon strut 163, is held in the closed position until the clip is crimped to a permanently fixed position.

Adding to the strength and rigidity of the clip are the lateral angled edges 172 and 173 of strut 163 and section 162 of L-shaped portion. FIG. 24 shows the lateral angled edges 173 of section 162 of the L-shape portion.

FIG. 23 shows holes 174 and 175 in section 161 of the L-shape portion to accommodate sheet metal screws or other fasteners in securing the clip to a framing stud. Hole 176 is provided in section 162 for the same purpose as seen in FIG. 24. FIGS. 22 and 23 illustrate ridge 168 along the centerline of strut 163 which rigidifies the strut and also helps to grip the wiring to prevent axially slippage. FIG. 28 illustrates by cross section the ridge 168 along strut 163 and flared lateral edges 172.

FIG. 27 shows the slight downward angled edges 177 of arm 164 which, upon hingeing, are angled away from the wires to prevent any cutting of insulation or sheathing by the edges of arm 164.

The clips of the present invention may readily accommodate wiring or cabling such as ROMEX or armored cable such as MC, AC or BX. In fact the clips of the present invention will even accommodate wiring in metal conduits even though not required by the code.

It will also be appreciated that the strap forms of the clip may come in various sizes such as the wire form to provide the required recessing of the wiring between more closely spaced studs.

Each form of the clips provides support bars for the conductors which in the wire form is the interior of the strut. The strap forms provide a more rigid support bar with the bent lateral edges acting as stiffening flanges. Each clip fits around multiple sizes and numbers of conductors and the conductors may already be in place or they may be strung through a previously positioned clip. Each clip also opens easily to allow the stringing of conductors and also has the ability to tighten on various sizes of conductors. The clips are made from round or flat wire or strip material and are cost effective and easy to make. Each clip positions the conductors a defined safe distance from the nearest edge for the 1990 NEC. Each clip also provides a quick and easy latching system which can be adjusted for conductor diameter and securely latched mechanically. Moreover, no extra parts are needed. The clips do not significantly interfere with the dry wall and the wire form actually drives directly into the wood and may be indented into the wood providing no interference with the wall board. Each form of the clip is easily attached to the studs with the strap forms being readily attachable to both metal or wooden studs. Moreover, the rolled, deburred, seamed, and coined edges of the strap forms not only provide a rigid support bar for the conductors but also protect the conductor insulation or sheathing.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A one piece stud clip for holding electrical wiring a required distance from the face of a stud to which dry wall is secured, said clip including an L-shaped first portion adapted to be secured to the stud, and a second wiring securing portion extending from and supported by said first portion parallel to the face of the stud and recessed therefrom, and means to secure wiring to said second portion, said second portion comprises a strut, said means includes an arm hinged to the distal end of said strut at the end of said strut remote from said L-shaped portion adapted to be locked generally parallel to said strut to secure wiring to the face of said strut.

2. A stud clip as set forth in claim 1 including hook means on the distal end of said arm to engage said strut and lock the same parallel thereto to enclose and secure wiring between said arm and strut.

3. A stud clip as set forth in claim 1 wherein said clip is a wire form and said L-shape portion terminates in a nail form adapted to be driven into the face of a wooden stud.

4. A stud clip as set forth in claim 3 wherein said L-shape portion includes a U-shape offset adapted to receive a fastener driven into the side of the stud.

5. A stud clip as set forth in claim 1 wherein said clip is a wire form clip, and said last mentioned means comprises a spring arm bent from the distal end of the strut and adapted to be closed upon and hooked against said strut to capture wiring between said strut and arm.

6. A stud clip as set forth in claim 2 wherein said clip is a wire form and all of the parts are bent from a single length of wire.

7. A stud clip as set forth in claim 1 wherein said clip is a strap form and said L-shape portion includes holes to receive screws, nails or other types of fasteners to be driven into the face and/or side of a metal or wood stud.

8. A stud clip as set forth in claim 1 wherein said clip is a strap form clip, and said last mentioned means comprises an arm bent from the distal end of the strut and adapted to be closed upon and hooked against said strut to capture wiring between said strut and arm.

9. A stud clip as set forth in claim 8 including a right angle tab extending from the distal end of said arm and adapted to be inserted through a slot in said strut and then folded generally parallel to said strut to lock the arm parallel to the strut.

10. A stud clip as set forth in claim 9 wherein said tab is more narrow than said arm.

11. A stud clip as set forth in claim 10 wherein the lateral edges of the strut are bent away from the arm and the lateral corners of the arm on the side toward the strut are coined.

12. A stud clip as set forth in claim 2 wherein said clip is a sheet metal strap form and all of the parts are stamped and bent from a single piece of sheet metal.

13. A one piece electrical clip for wood or metal stud framing for a dry wall to support one or more runs of wiring side-by-side and recessed from the face of a stud to which wall board is secured, said clip comprising means to secure said clip to the face or side of a stud, and including a strut running from the side of the stud parallel to the face of the stud and recessed from such face a required distance, and means to secure wiring side-by-side to said strut to hold the wiring at said required recessed spacing from the face of the stud, said wire securing means including an arm secured to said strut and deformable about such wiring to hold such wiring to said strut.

14. An electrical clip as set forth in claim 13 wherein said strut and arm are hinged together at one end and hooked together at the other end to hold wiring therebetween side-by-side.

15. An electrical clip as set forth in claim 14 wherein said one end is remote from the means to secure said clip to the face or side of the stud.

16. An electrical clip as set forth in claim 15 wherein said clip is a wire form and all of the parts are bent from a single length of wire.

17. An electrical clip as set forth in claim 16 wherein an end of said clip includes a nail form adapted to be driven into the face of a wooden stud.

18. An electrical clip as set forth in claim 15 wherein said clip is a sheet metal strap form and all of the parts are stamped and bent from a single piece of sheet metal.

19. An electrical clip as set forth in claim 18 including a right angle tab extending from the distal end of said arm and adapted to be inserted through a slot in said strut and then folded generally parallel to said strut to lock the arm parallel to the strut.

20. An electrical clip as set forth in claim 19 wherein said tab is more narrow than said arm.

21. An electrical clip as set forth in claim 20 wherein the lateral edges of the strut are bent away from the arm and the lateral corners of the arm on the side toward the strut are angled slightly away from the strut.

22. An electrical clip as set forth in claim 21 wherein the lateral edges of the leg of the L-shape portion perpendicular to the strut and arm are bent away from the side facing the strut.

23. An electrical clip as set forth in claim 21 wherein the strut includes a central ribbed portion protruding on the side facing the arm.

24. An electrical clip as set forth in claim 13 wherein prior to use the arm and strut are in flattened sheet metal form with each in the same plane.

25. An electrical clip as set forth in claim 24 wherein a hole is placed at the interface of said arm and said strut to predispose the desired hinging action at the location of said hole.

* * * * *